Jan. 15, 1957     M. E. WOOD     2,777,648
ARBOR FOR SHAFT
Filed Nov. 4, 1952

*INVENTOR.*
MORRIS E. WOOD
BY
Charles S. Penfold
ATTORNEY

United States Patent Office 2,777,648
Patented Jan. 15, 1957

2,777,648

ARBOR FOR SHAFT

Morris E. Wood, Bronson, Mich., assignor to Higbie Manufacturing Company, a corporation of Michigan Application November 4, 1952, Serial No. 318,595

3 Claims. (Cl. 242—119)

This invention relates generally to fishing tackle, and more particularly is directed to an accessory or arbor adapted for association with the spool of a fishing reel.

The subject invention contemplates the utilization of an arbor which is adapted to be detachably connected to a conventional shaft or a spool in order to facilitate and expedite the proper delivery and return of the line, particularly while casting. Thus, the owner of a conventional reel may promote its efficiency by the simple expedient of attaching thereto the arbor embodying the improved principles of design and construction of the subject invention. It is to be understood that insofar as the subject invention is concerned the arbor sections may also provide a support for film, tape or other line material.

One of the principal objects of the invention is to provide an arbor preferably comprised of a minimum number of corresponding sections or parts which can be easily and quickly assembled and disassembled with respect to a spool an unlimited number of times.

An important object of the invention is to provide an arbor of the character just referred to, in which each of the sections preferably includes shaft-engaging bearing means and locking means or components, the locking means on the sections serving to secure the sections about a shaft of a spool.

More particularly, an object of the invention is to provide an arbor assembly in which each section thereof is preferably moulded in the form of a semi-cylindrical shell having an outer cylindrical material supporting wall, an inner cylindrical bearing concentric with the outer supporting wall, axially extending web structure, and radial or transversely extending centrally disposed web structure for joining and reenforcing the material supporting wall and inner bearing.

Another object of the invention is to provide the inner cylindrical bearing of each section with a pair of corresponding axially extending sockets or groove formations and a pair of corresponding axially extending projections or tongue formations, the arrangement being such that when the arbor sections are secured together about a shaft the socket and tongue formations on the sections will respectively yieldably cooperate with one another to provide a plurality of detachable connections between the sections.

A specific object of the invention is to provide the transversely extending centrally disposed web structure with chordally arranged holes through which a line can be inserted to assist in holding the sections assembled and with respect to the shaft.

Another object of the invention is to provide each of the cylindrical bearings with a key for keying each arbor section to the shaft of a spool.

Additional objects or attributes of the invention reside in its simplicity, durability, light weight, and low cost of manufacture.

Other objects and advantages of the invention will become evident after considering the description hereinafter set forth in conjunction with the drawing annexed hereto.

Figure 1:
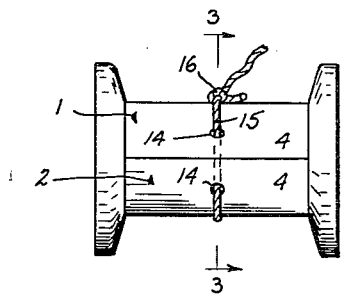
Figure 1 is a front view of a conventional reel spool showing the arbor assembly, embodying the invention, applied thereto.

The arbor, embodying the improved principles of design and construction of the subject invention exemplified in the drawing, is preferably comprised of two sections generally designated 1 and 2, which are substantially identical in character and constructed of some desirable material impervious to water, such as moulded plastic having properties suitable for the purposes above described.

Each of the arbor sections is preferably made in the form of a shell substantially semi-cylindrical in character. The sections, when assembled on a conventional shaft 3 of a fishing reel spool, provide a firm cylindrical supporting surface for a line or ribbon material.

More specifically, each section includes, among other things, an outer semi-cylindrical line supporting wall 4 of substantially uniform thickness, an inner axially extending cylindrical bearing 5 concentric with the outer wall 4, a central radial web or rib comprised of portions 6, 7 and 8, a pair of axially extending parallel webs 9 at one extremity of the section, and a pair of corresponding axially extending webs or ribs at the other extremity of the section. The radial or central web and the pairs of axially extending webs serve to join and reenforce the line supporting wall 4 and the bearing 5. The inner ends of the axially extending webs are joined to the radial web and the portions 6, 7 and 8 of the radial web reenforce the central area of each arbor section. It will be noted that each pair of axially extending webs, the bearing and line supporting wall form a tube at each extremity of each section, each tube being closed by the portion 7 of the radial web, which portion constitutes a common partition to both tubes. This arrangement of webs or ribs lends stability to each arbor section and appreciably reduces its weight.

Figure 2:
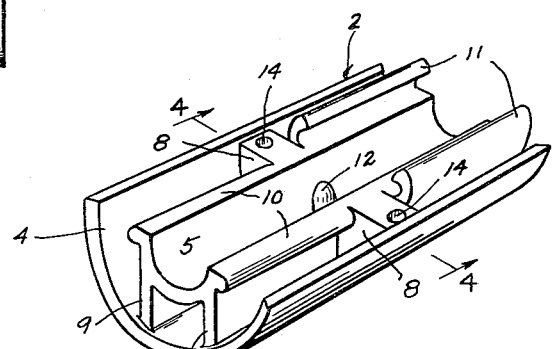
Figure 2 is a perspective view of one of the arbors showing the internal structure thereof.

The unique locking means employed to secure the arbor sections about the spool shaft may be designed and constructed in various ways, but as illustrated in Figure 2, each section is provided with a pair of corresponding axially extending substantially diametrically disposed projections or tongue formations 10 at one extremity and a pair of axially extending substantially diametrically disposed socket or groove formations 11 at its other extremity. It will be noted that the formations are carried by the inner cylindrical bearing 5 and project laterally outwardly therefrom. The arrangement is such that the tongue formations and portions of the bearing to which they are joined may yield to some extent and the same is true of the groove formations. Moreover, the portions defining each groove or socket are formed so they may yield when the tongues are detachably received therein.

Figure 3:
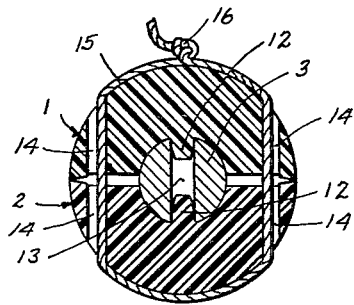
Figure 3 is a transverse section taken substantially on line 3—3 of Figure 1 depicting the manner of keying the arbor sections to the shaft, and mode of connecting a fish line to such sections.
Figure 4:
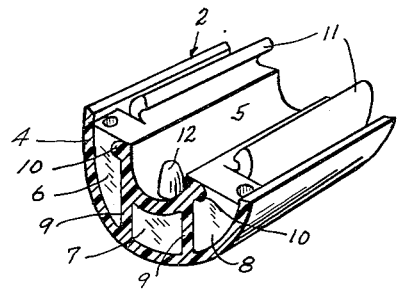
Figure 4 is a perspective view showing one of the pair of arbor sections with a portion thereof in section.
Figure 5:
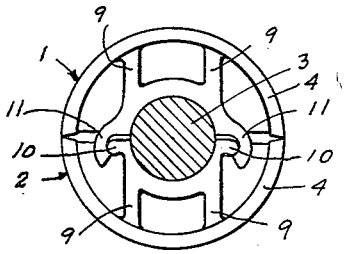
Figure 5 is an end view of the assembly shown in Figure 1, with the shaft in section.

The means employed for keying each of the arbor sections to the shaft 3 comprises an inwardly extending radial pin or key 12 which is adapted to project into a conventional line receiving hole 13 in the shaft as shown in Figure 3.

To assemble the sections about the shaft is a relatively simple matter because it is merely necessary to manipulate them into a position so that the tongues and grooves of one section will respectively register with the grooves and tongues on the other section and then press the sections together so that the tongues will snap into the grooves and so that the pins 12 will extend into the line receiving hole 13 as shown in Figure 3. When the sections are thus assembled with the shaft, the supporting walls 4 of the sections form a substantially uniform cylindrical surface for a line. It will be noted that the locking components are so disposed they are in balance when the arbor and spool are rotated in unison. The sections can be readily separated from the shaft by merely inserting a sharp edged instrument, such as a knife blade, between the adjacent longitudinal marginal edges of the sections and then prying them apart.

In order to facilitate the attachment of a line to the arbor, each of the portions 6 and 8 of the radial web of each arbor section is preferably provided with a chordally disposed hole 14 so that when the sections are assembled as illustrated in Figure 3, a line 15 can be threaded through the holes and then tied as indicated at 16 to assist in securing the sections together and the sections to the shaft.

As clearly exemplified, the marginal longitudinal edges and end edges of the sections are preferably bevelled so that the longitudinal edges of the respective sections will intimately engage one another as shown in Figure 3 and the end edges will conformably engage the spool flanges so as to prevent the line from receding and becoming caught between the ends of the sections and the spool flanges.

While the foregoing invention has been described with particularity, it will be readily understood that various changes in the arrangement, construction and combination of parts, as well as substitution of equivalents and substitution of materials may be made in the device without departing from the spirit of the invention as definitely determined by the appended claims.

I claim:

1. A pair of moulded plastic arbor sections for a shaft, each of said sections comprising an elongated shell, internal axially extending means forming with the shell a pair of tubular formations providing bearing means for engaging a shaft, a pair of socket formations provided on one of the tubular formations and a pair of tongue formations provided on the other tubular formation, the socket formations on the respective sections being yieldable to accommodate the tongue formations.

2. A pair of arbor sections for a shaft, each of said sections comprising a shell having an outer wall, internal bearing means for engaging a shaft, and a socket formation and a tongue formation provided on each bearing means for securing the sections about a shaft to form an arbor therefor, the formations on the respective sections being substantially identical.

3. A pair of arbor sections for a shaft, each of said sections comprising an elongated shell having an outer substantially arcuate wall, internal bearing means for engaging a shaft, a central radial formation, a pair of corresponding axially extending substantially diametrically disposed groove formations carried by the bearing means and located at one side of the radial formation, and a pair of corresponding axially extending substantially diametrically disposed tongue formations located at the other side of the radial formation, the groove and tongue formations on the respective sections being yieldably cooperative to secure the sections about a shaft to form an arbor therefor, and means for keying at least one of the sections to a shaft.

References Cited in the file of this patent

UNITED STATES PATENTS

| 806,064 | Carter | Nov. 28, 1905 |
| 823,401 | Ferris | June 12, 1906 |
| 1,832,590 | Sponable et al. | Nov. 17, 1931 |
| 1,855,738 | Case | Apr. 26, 1932 |
| 2,336,981 | Clickner | Dec. 14, 1943 |
| 2,344,665 | Adams | Mar. 21, 1944 |
| 2,669,399 | Wood | Feb. 16, 1954 |

FOREIGN PATENTS

| 265,489 | Switzerland | Sept. 16, 1950 |